US012236794B2

(12) United States Patent
Narasimhulu et al.

(10) Patent No.: US 12,236,794 B2
(45) Date of Patent: Feb. 25, 2025

(54) AIRCRAFT ARRIVAL MANAGEMENT SYSTEMS AND METHODS

(71) Applicant: The Boeing Company, Chicago, IL (US)

(72) Inventors: Veeresh Kumar Masaru Narasimhulu, Bangalore (IN); Ajaya Srikanta Bharadwaja, Bangalore (IN)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 17/539,107

(22) Filed: Nov. 30, 2021

(65) Prior Publication Data

US 2023/0169876 A1 Jun. 1, 2023

(30) Foreign Application Priority Data

Nov. 25, 2020 (IN) ............................. 202011051285

(51) Int. Cl.

| | |
|---|---|
| ***G08G 5/02*** | (2006.01) |
| ***G08G 5/00*** | (2006.01) |
| ***G08G 5/04*** | (2006.01) |

(52) U.S. Cl.

CPC ........... *G08G 5/025* (2013.01); *G08G 5/0043* (2013.01); *G08G 5/0091* (2013.01); *G08G 5/045* (2013.01)

(58) Field of Classification Search

CPC .... G08G 5/025; G08G 5/0043; G08G 5/0091; G08G 5/045

See application file for complete search history.

(56) References Cited

U.S. PATENT DOCUMENTS

| | | | |
|---|---|---|---|
| 7,877,197 | B2 | 1/2011 | Lewis et al. |
| 8,107,961 | B1 | 1/2012 | Vargantwar et al. |
| 8,682,316 | B2 | 3/2014 | Lynch et al. |
| 9,355,566 | B2 | 5/2016 | Garrido-Lopez et al. |
| 9,430,948 | B2 | 8/2016 | Henderson |
| 10,269,251 | B2 | 4/2019 | Berge |
| 10,402,675 | B2 | 9/2019 | Owechko |
| 2014/0343760 | A1 | 11/2014 | Le Gall et al. |

(Continued)

FOREIGN PATENT DOCUMENTS

| | | | |
|---|---|---|---|
| EP | 2849167 | A1 | 3/2015 |
| EP | 3671695 | A1 | 6/2020 |

(Continued)

OTHER PUBLICATIONS

Computation of Optimal Profiles in Descent and Approach Phases Ramon Andreu Altava Hal science (Year: 2020).*

Successive Convexification for 6-DoF Powered Descent Guidance with Compound State-Triggered Constraints-Szmuk et al, AIAA Scitech Forum (Year: 2019).*

Wong, Cheryl Sze Yin et al., "CDAS: A Cognitive Decision-Making Architecture for Dynamic Airspace Sectorization for Efficient Operations." IEEE Transactions on Intelligent Transportation Systems 20.5 (2018): 1659-1668.

(Continued)

*Primary Examiner* — Hussein Elchanti
*Assistant Examiner* — Oliver Tan
(74) *Attorney, Agent, or Firm* — Joseph M. Butscher; The Small Patent Law Group LLC

(57) ABSTRACT

Systems and methods for aircraft arrival management are disclosed. The system is configured to control a timing of landing between a leading and a trailing aircraft by calculating backward trajectories for each of the aircraft from a common touchdown point on a runway. The system is further configured to compute a delta distance, based on a separation threshold distance, corresponding to a travel distance for the trailing aircraft along an arc centered around a merge point, before turning towards a merge point.

20 Claims, 8 Drawing Sheets

(56) References Cited

U.S. PATENT DOCUMENTS

| | | | | |
|---|---|---|---|---|
| 2015/0081198 | A1* | 3/2015 | Garrido-Lopez .... | G08G 5/0082 701/122 |
| 2015/0120100 | A1 | 4/2015 | Sacle et al. | |
| 2016/0362194 | A1* | 12/2016 | Boyer ..................... | B64C 19/00 |
| 2017/0018196 | A1* | 1/2017 | Shay .................... | G05D 1/0005 |
| 2018/0009545 | A1 | 1/2018 | Black, Jr. et al. | |
| 2018/0061243 | A1 | 3/2018 | Sloosh | |
| 2018/0218615 | A1 | 8/2018 | Myr | |
| 2018/0284813 | A1 | 10/2018 | Boyer et al. | |
| 2020/0023994 | A1* | 1/2020 | Lax ...................... | G05D 1/0005 |
| 2020/0202724 | A1* | 6/2020 | De Riese ............. | G08G 5/0034 |

FOREIGN PATENT DOCUMENTS

| | | | | |
|---|---|---|---|---|
| GB | 2589302 | A * | 6/2021 | ............. G05D 1/101 |
| JP | 2016062449 | A | 4/2016 | |
| WO | 2013078461 | A1 | 5/2013 | |

OTHER PUBLICATIONS

European Patent Office, Extended European Search Report regarding European Patent Application No. 21194233.9, dated Feb. 22, 2022, 9 pages.

European Patent Office, Extended European Search Report regarding European Patent Application No. 21194037.4, dated Feb. 24, 2022, 9 pages.

Gianazza et al., "Learning Air Traffic Controller Workload from Past Section Operations", HAL open science, HAL Id: hal-01592233, submitted on Sep. 22, 2017, 8 pages.

U.S. Patent and Trademark Office, Non-Final Office Action regarding U.S. Appl. No. 17/539,096, dated Feb. 14, 2024, 23 pages.

Ribeiro et al., Review of Conflict Resolution Methods for Manned and Unmanned Aviation, Aerospace 2020, 7, 79; doi:10.3390/aerospace7060079, Jun. 16, 2020, 37 pages.

U.S. Patent and Trademark Office, Final Office Action regarding U.S. Appl. No. 17/539,096, dated Jun. 12, 2024, 22 pages.

* cited by examiner

AIRCRAFT ARRIVAL MANAGEMENT SYSTEMS AND METHODS

BACKGROUND

Aircraft arrival trajectories are typically coordinated through a merge point before queuing up for landing on a runway. Air traffic controllers need to establish an arrival sequence with adequate separation between aircraft. To achieve such separation, controllers intuitively employ path stretching or speed control techniques. In some instances, a desired time delay is achieved by instructing an aircraft to turn onto an arc centered around a merge point for a specified distance before turning off the arc and toward the merge point. Currently, controllers lack precise tools for determining when to instruct an aircraft to turn toward the merge point so as to provide a safe and efficient landing sequence for a series of incoming aircraft. Controllers must err on the side of safety, which may result in excess spacing between aircraft, causing wasted time, fuel, and controller workload. Efficient systems and methods for providing altered flight paths to achieve optimal separation between successive pairs of incoming aircraft are therefore desirable.

SUMMARY

The present disclosure provides systems, apparatus, and methods relating to aircraft arrival management. In some examples, a method of controlling timing of aircraft landing may include selecting a first leading aircraft and a first trailing aircraft, each aircraft being on a flight path configured for landing on a runway. The method may include back calculating a trajectory profile from a touchdown point on the runway, to a current airspace position of the first leading aircraft, and estimating when the first leading aircraft will arrive at the touchdown point. The method may include back calculating a trajectory profile from the touchdown point to a current airspace position of the first trailing aircraft, and determining a time point when the first trailing aircraft will intersect an arc having a merge point. The method may include stopping back-calculation of the trajectory profile for the first leading aircraft at the time point when the first trailing aircraft will intersect the arc, and then calculating a delta distance that the first trailing aircraft should travel along the arc before turning toward the merge point to provide adequate separation between the first leading aircraft and the first trailing aircraft for safe landing.

In some examples, a method of controlling timing of aircraft landing may include selecting a first leading aircraft and a first trailing aircraft, each aircraft being on a flight path configured for landing on a runway. The method may include back calculating flight trajectories for each aircraft from a touchdown point on the runway. The method may include determining a threshold separation distance required between the leading and trailing aircraft for safe landing, and then calculating a delta distance, based on the threshold separation distance, corresponding to a travel distance of the first trailing aircraft along an arc centered around a merge point, before turning toward the merge point.

In some examples, a system for controlling timing of aircraft landing, may include one or more processors, a memory including one or more digital storage devices, and a plurality of instructions stored in the memory and executable by the one or more processors to back calculate flight trajectories for each of a leading aircraft and a trailing aircraft from a common touchdown point on a runway. The system may be configured to determine a threshold separation distance required between the leading and trailing aircraft for safe landing. The system may then calculate a delta distance, based on the threshold separation distance, corresponding to a travel distance of the trailing aircraft along an arc centered around a merge point, before turning toward the merge point.

Features, functions, and advantages may be achieved independently in various examples of the present disclosure, or may be combined in yet other examples, further details of which can be seen with reference to the following description and drawings.

DETAILED DESCRIPTION

Figure 1:
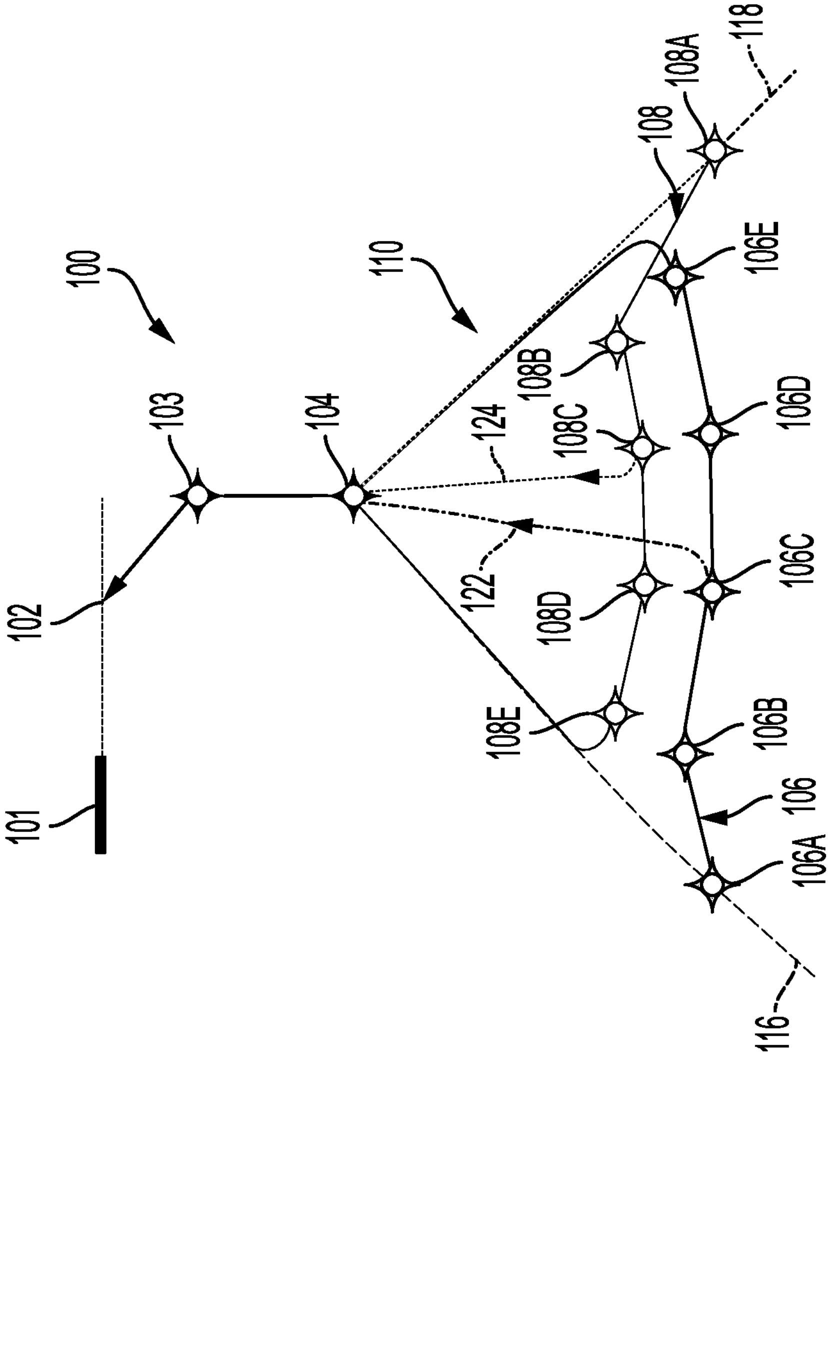
FIG. 1 is a schematic diagram of flight path envelopes for an aircraft arrival management system.

Various aspects and examples of an efficient aircraft arrival management, as well as related methods, are described below and illustrated in the associated drawings. Unless otherwise specified, an aircraft arrival management in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A-C, each of which is labeled accordingly.

Overview

In general, aircraft arrival management systems, as described herein, manage and control flight operations of a plurality of incoming aircraft. Air traffic controllers guide incoming aircraft to ensure adequate space between successive landing aircraft. The disclosed aircraft arrival management systems provide tools for efficiently controlling the timing and spacing between leading and trailing landing aircraft. Landing timing may be controlled by generating altered flight paths for a trailing aircraft. The altered flight paths may be derived from backward trajectory calculations based on aircraft performance characteristics, and extending between a touchdown point and the trailing aircraft.

Technical solutions are disclosed herein for efficient aircraft arrival management. Specifically, the disclosed systems and methods address technical problems involving aircraft arrival management technology. Disclosed technical solutions may be implemented through use of computers configured for managing arrival air traffic at airports. For example, systems and methods disclosed herein solve technical problems by back calculating trajectories for a leading aircraft and a trailing aircraft to provide an optimal turn point for continuous descent flight operations. The technical features associated with addressing this problem involve (i) pairwise sequencing of arrival traffic in terms of a leading aircraft and a trailing aircraft; (ii) back calculation of flight trajectories for the leading aircraft and the trailing aircraft; (ii) estimation of an optimal turn point off an arc toward a merge point for the trailing aircraft.

Aspects of aircraft arrival management may be embodied as a computer method, computer system, or computer program product. Accordingly, aspects of the aircraft arrival management may take the form of a hardware, software (including firmware, resident software, micro-code, etc.), or an example combining software and hardware aspects, all of which may generally be referred to herein as a "circuit," "module," or "system." Furthermore, aspects of the aircraft arrival management may take the form of a computer program product embodied in a computer-readable medium (or media) having computer-readable program code or instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of these. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, or any suitable combination of these.

Computer program code for carrying out operations for aspects of aircraft arrival management systems may be written in one or any combination of programming languages, including an object-oriented programming language such as Java, Smalltalk, C++, and conventional procedural programming languages, such as C. Mobile apps may be developed using any suitable language, including those previously mentioned, as well as Objective-C, Swift, C#, HTML5. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and the connection may be made to an external computer (for example, through the Internet using an Internet Service Provider).

Aspects of the aircraft arrival management system are described below with reference to flowchart illustrations or block diagrams of methods, apparatuses, systems, and computer program products. Each block or combination of blocks in a flowchart or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, or other device to function in a particular manner, such that the instructions stored in the computer-readable medium produce an article of manufacture including instructions which implement the function specified in the flowchart or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions specified in the flowchart and/or block diagram block(s).

Any flowchart or block diagram in the drawings is intended to illustrate the architecture, functionality, or operation of possible implementations of systems, methods, and computer program products according to aspects of the disclosed aircraft arrival management systems. In this regard, each block may represent a module, segment, or portion of code, which comprises one or more executable instructions for implementing the specified logical function (s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of aircraft arrival management as well as related systems and methods. The examples in these sections are intended for illustration and should not be interpreted as limiting the entire scope of the present disclosure. Each section may include one or more distinct examples, contextual or related information, function, or structure.

Definitions

Waypoint: A waypoint is an intermediate point or place on a flight path, a stopping point in physical space or point at which a course of a flight path changes. A waypoint may be defined by sets of computer-generated coordinates, including longitude, latitude, and altitude coordinate details. A waypoint may additionally or alternatively be defined as a time point, with specifications of aircraft speed at that point or in terms of distance from any other point.

PBN: Performance-Based Navigation (PBN) is based on requirements for aircraft operating along an air traffic services route, on an instrument approach procedure, or in a designated airspace.

CDO: Continuous Descent Operation (CDO) is an aircraft operating technique in which an arriving aircraft descends from an optimal position with minimum thrust and avoids level flight to the extent permitted by the safe operation of the aircraft and compliance with published procedures and Air Traffic Controller instructions.

ATC: Air traffic control (ATC) is a service provided by ground-based air traffic controllers who direct aircraft on the ground and through controlled airspace, and can provide advisory services to aircraft in non-controlled airspace.

P-RNAV: Aircraft Precision-Area Navigation (P-RNAV) equipment automatically determines aircraft desired flight paths by a series of waypoints held in a database.

A. Illustrative System for Controlling Timing of Aircraft Landing

As shown in FIGS. 1-5, this section describes an illustrative system for controlling the timing of aircraft landing, including a backward trajectory management system. The described system is an example of an aircraft arrival management system as described above.

Point merge operations described in the following disclosure may include one or more operations of a Point Merge System (PMS) introduced by EUROCONTROL's Experimental Centre. Many airports worldwide have implemented PMS as an Air Traffic Control (ATC) protocol to support Continuous Descent Operations (CDO) for aircraft arrivals. PMS is a systemized method relying on a specific Performance Based Navigation (PBN) design and allows controllers to achieve airborne spacing, sequencing, and merging of aircraft arrivals. PMS aims to offer an easy and intuitive operating method for ATC controllers, while providing a balanced trade-off between capacity, aircraft flight efficiency, and environmental impact.

FIG. 1 is a schematic diagram of aircraft flight paths 100 arriving at a runway 101, in accordance with point merge-operations. In the illustrated example, a merging waypoint or merge point center 104 (e.g. a merge point) is provided in proximity to runway 101 of an airport. The point merge operations include defining fly arcs or lateral sequencing legs with respect to merge point 104. In the illustrated example, two arcs, namely, a first arc 106 and a second arc 108, are defined. The arcs 106, 108 are substantially circular or quasi-arc-shaped, and spaced at a constant distance from merge point 104. In some examples, a single arc or more than two arcs may be defined based on arrival aircraft traffic and capacity of runway 101.

Relative lengths, directions, and positioning of arcs 106, 108 are subject to capacity requirements and specific constraints. In the present example arcs 106, 108 are defined in opposite directions, and are substantially parallel or fully overlapping, leading to a requirement of arcs 106, 108 to be vertically separated. In some examples, arcs 106, 108 may be defined in the same direction and be fully dissociated or have a partial overlap with one another. Dissociated arcs either use more airspace horizontally or provide less path stretching capacity but allow for less vertical constraints. For example, merge point 104 may be at 6,000 feet (ft) from ground level. Arcs 106, 108 may be at flight levels of 10,000 ft, and 12,000 ft, respectively, and spaced by at least twenty Nautical Miles (NM) from merge point 104.

Arcs 106, 108 are defined according to Precision Area Navigation (P-RNAV) protocols and include a plurality of arc waypoints or arc points 106A-E, 108A-E, respectively. Together, arcs 106, 108 define a flight path envelope 110 specifically for merge point 104 and runway 101. In the present example, as arcs 106, 108 are fully overlapping, path envelope 110 may be in a most compact form, and using least horizontal airspace. Aircraft flying along arcs 106, 108 are constrained in speed and altitude and follow along arc points 106A to 106E, 108A to 108E, respectively. In other words, a pair of aircraft each flying along one of arcs 106, 108 may be under controlled speed limits and vertically separated by a predefined distance to avoid airspace conflicts.

In accordance with the point merge operations, for example, each aircraft arriving from a first arrival flight path 116 is instructed to level-off, maintain altitude and speed, and follow first arc 106 along arc points from 106A to 106E (which appears slightly further away from the merge point 104 in FIG. 1). Similarly, each aircraft that arrives following a second flight path 118 is instructed to level-off, maintain altitude and speed, and follow arc 108 along arc points from 108A to 108E (which appears slightly closer to the merge point 104 in FIG. 1). The above operation is continuously monitored by an ATC Operator (ATCO) (e.g., an air traffic controller) by checking speed, flight level, and spacing of aircraft in both arcs 106, 108.

If there are no aircraft between arcs 106, 108 and the merge point 104, or preceding aircraft are sufficiently far beyond the arcs 106, 108, then ATCO sends a command (e.g., a DIRECT command) to aircraft on arcs 106, 108. This command includes an instruction for aircraft to exit arc 106 or 108 immediately, make an inbound turn, and descend toward merge point 104. For example, in FIG. 1, for aircraft flying along first arc 106, a possible flight path 122 is illustrated as exiting first arc 106 at arc point 106C and descending toward merge point 104. Similarly, for aircraft flying along second arc 108, a possible flight path 124 is illustrated as exiting second arc 108 at arc point 108C, and descending toward the merge point 104.

Aircraft reaching merge point 104 by possible flight paths 122 or 124, or any other alternate flight path from arcs 106, 108 are under CDO mode. Aircraft under CDO mode descend continuously, to a maximum possible extent, by employing minimum engine thrust, ideally in a low drag configuration, before the final approach point 103. An optimum CDO procedure starts from any of arc points 106A-E or 108A-E on arcs 106, 108 respectively, and uses continuous descent profiles that reduce controller-pilot communications and segments of level flight. Furthermore, it provides for a reduction in noise, fuel burn and emissions, while increasing flight stability and the predictability of flight path to both ATC controllers and pilots. Airspeed and the rate of descent of aircraft landing on runway 101 are reduced further beyond approach point 103. Aircraft descend at a low enough rate from approach point 103 to allow for a gentle touch down at touch down point 102 on runway 101. Landing is accomplished by descending to runway 101, and speed reduction is accomplished by reducing thrust and inducing a higher amount of drag using flaps, landing gear, or speed brakes. ATCO performs continuous monitoring of aircraft speed between approach point 103 to touch down point 102, to deliver aircraft at an optimized and appropriate speed at touchdown point 102 on runway 101 for a smooth landing.

Figure 2:
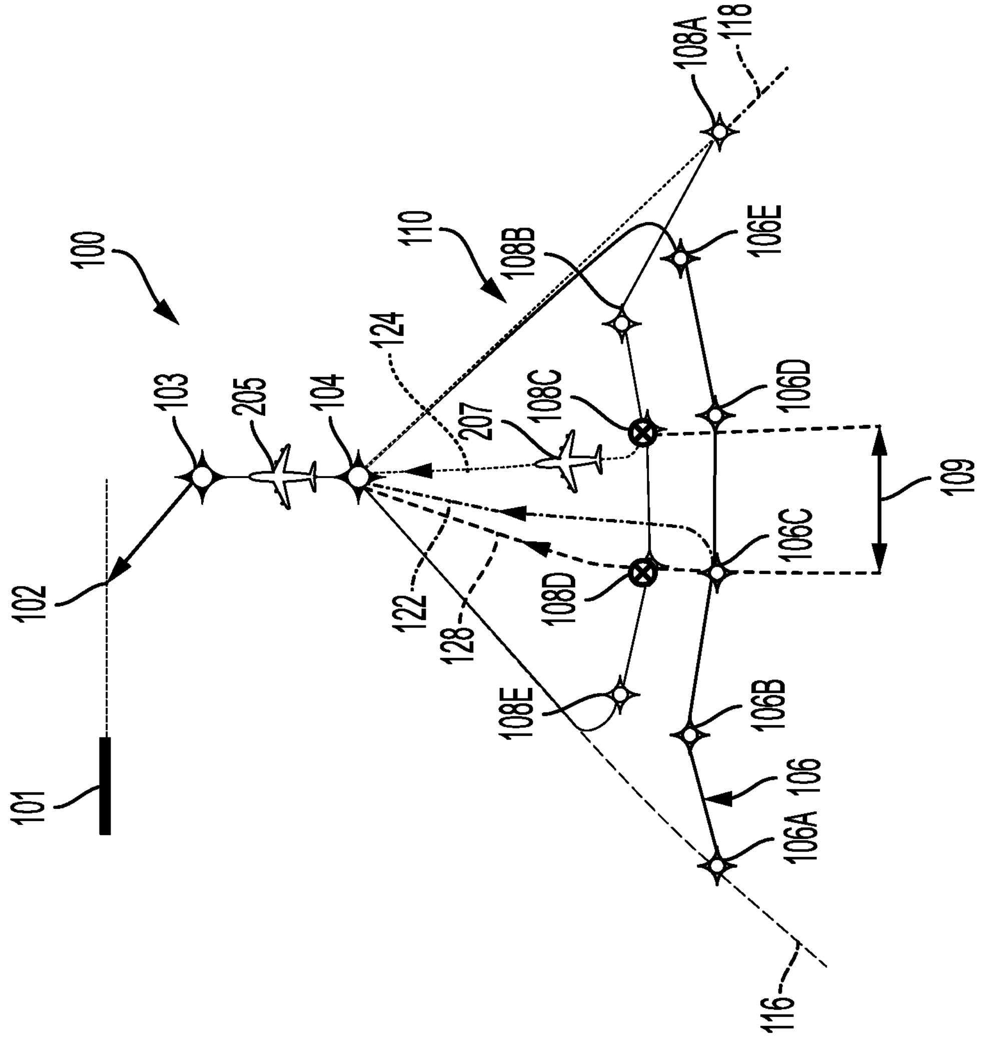
FIG. 2 is a schematic diagram of flight paths for a leading and a trailing aircraft in the flight path envelope of FIG. 1.

For example, as shown in FIG. 2, a first leading aircraft 205 arriving into path envelope 110, by arrival flight path 116, for landing on runway 101, may have traversed along first arc 106. Upon receiving inbound turn instructions from ATCO, first leading aircraft 205 may have taken an inbound turn at 106C and traversed along flight path 122 towards merge point 104. First leading aircraft, as seen in FIG. 2, is descending towards approach point 103 after crossing merge point 104, and further heading towards touch down point 102 on runway 101.

Subsequently, a trailing aircraft 207 approaching or arriving into path envelope 110 for landing on runway 101 by arrival flight path 118, may traverse along second arc 108. In anticipation of instructions from ATCO, first trailing aircraft may have moved from first arc point 108A to second arc point 108B. At this point, ATCO has at least two possibilities of directing first trailing aircraft 207 to make an inbound turn on arc 108, including instructing trailing aircraft 207 to turn at either arc points 108C or 108D before traversing further to arc point 108E along arc 108.

As seen in FIG. 2, as per instruction of ATCO, first trailing aircraft 207 takes an inbound turn at 108C to head towards merge point 104 along flight path 124. In this case, first trailing aircraft 207 may reach merge point 104 and then touch down point 102 too early. Therefore, a separation distance between first trailing aircraft 207 and first leading aircraft 205, is less than a minimum radar separation R.

Instead of following flight path 124 (e.g., a relatively shorter flight path) to merge point 104, first trailing aircraft may continue along second arc 108 and make an inbound turn at 108D and then descend directly to merge point 104 via flight path 128 (e.g., a relatively longer flight path). The total length of the flight path for reaching merge point 104 along flight path 128 is longer than that of the flight path 124. As a result, the aircraft would have a delayed arrival time at merge point 104 compared to the prior example. In other words, if trailing aircraft 207 turns at waypoint 108D, then it would have to travel an additional distance 109 between arc points 108C and 108D. This may result in an excessive separation distance between the leading and trailing aircraft, causing wasted time, fuel, and other resources.

As described above, ATCO controllers use their intuition and experience to handle point merge operations in order to estimate the time and position of inbound turn for aircraft 205, 207 on arcs 106, 108 to merge point 104. However, these operations also have the following drawbacks: (i) aircraft spacing D between leading and trailing aircraft achieved at touch down point 102 and on runway 101 can vary and may never be very close to minimum radar separation; (ii) excess aircraft spacing D may result in decreased runway throughput; and (iii) ATC controller workload increases because of inbound turn point calculation for every incoming aircraft. Cumulatively, all the above reasons may result in a significant decrease in the runway throughput, increase in total flight time, and excess fuel consumption and carbon emissions.

The present disclosure provides for systems and methods that assist ATCO controllers and pilots while carrying out point merge-operations. They provide for accurate separation estimation that helps in achieving ideal aircraft spacing D that is very close to minimum radar separation R. This will not only further reduce the controller and pilot workload but also enhance the throughput of the runway.

Figure 3:
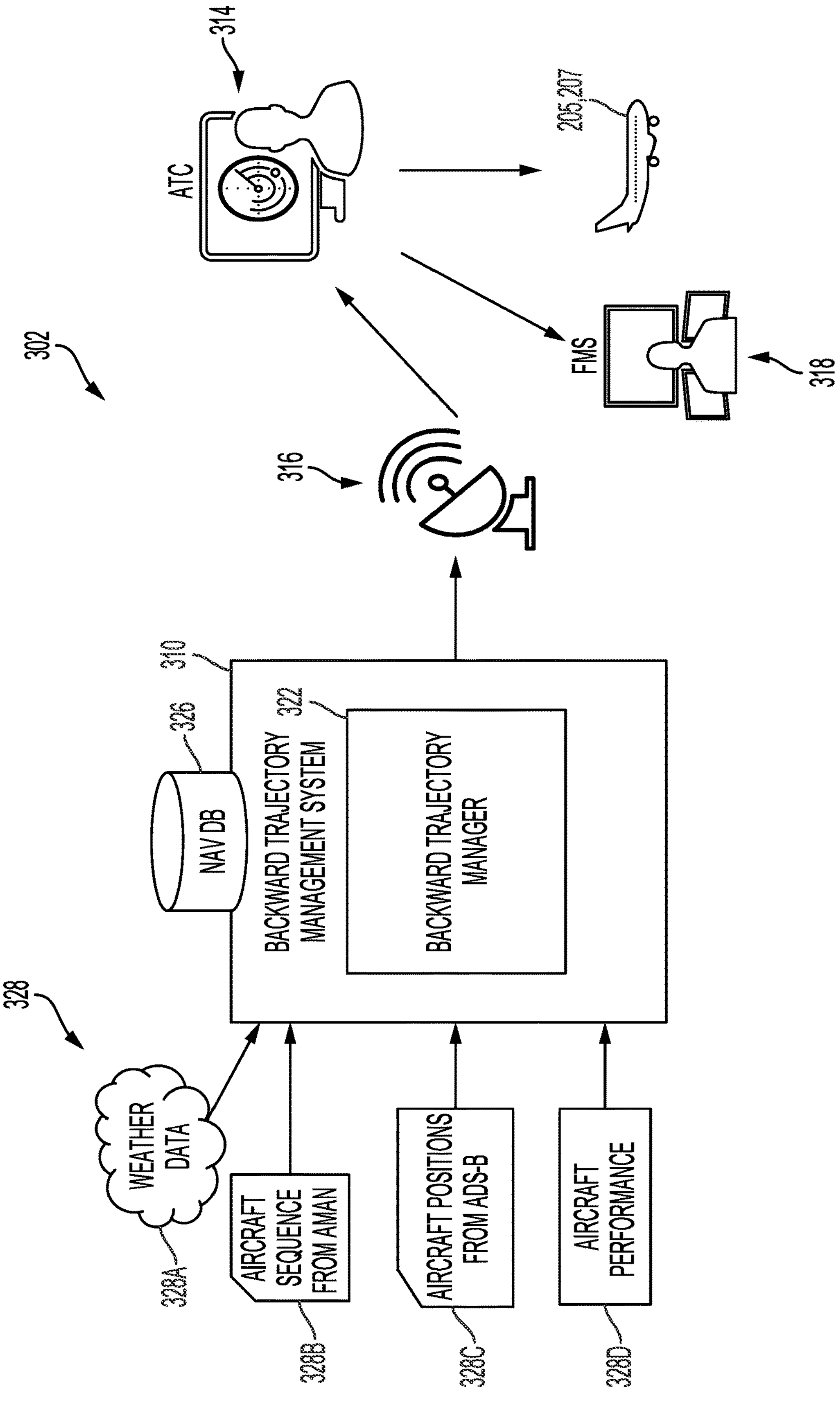
FIG. 3 is a schematic diagram of an aircraft arrival management system.

FIG. 3 shows a schematic for an aircraft arrival management system 302, including a Backward Trajectory Management System (BTM) system 310 in synchronous communication with ATC 314 through a radar communication system 316. ATC is communicatively linked to a Flight Management System (FMS) 318. BTM system 310 may receive broadcasted status information from FMS system 318 about aircraft 205, 207, and a plurality of other aircraft arriving to land on one or more airport runways.

Referring back to FIG. 2, BTM system 310 receives information about one or more aircraft and their relative separations at different arrival positions including aircraft on runway 101, aircraft proximate to touchdown point 102, aircraft proximate to approach point 103, aircraft proximate to merge point 104, aircraft proximate to arcs 106, 108, and aircraft inside and outside of path envelope 110. Optionally, BTM system 310 may receive other relevant information to generate trajectories based on backward calculations for successive pairs of aircraft. Each pair of aircraft includes a first leading aircraft 205 and first trailing aircraft 207 as described above.

The terms “first” and “second” pair of aircraft are employed only to signify a particular order to the calculations in correlation to a sequence of aircraft arriving for landing at runway 101. In particular, the following disclosure describes in detail back-calculation trajectories computed for a first pair of aircraft, namely a first leading and a first trailing aircraft 205, 207, referring to a relative position of the leading and the trailing aircraft 205, 207 measured from touchdown point 102 on a runway 101. Similarly, while computing back-calculation trajectories for a second pair of aircraft, first trailing aircraft 207 from the first pair of aircraft is reassigned or redesignated as a second leading aircraft to pair up with a second trailing aircraft 209 and so on for sequencing of aircraft arriving for landing on runway 101.

BTM system 310 includes a Backward Trajectory Manager (BTM) or Manager 322 in synchronous data communication with a Navigation Database 326. Manager 322 is configured to accumulate transmitted traffic data and airspace data from one or more external sources 328, and compute backward trajectories for pairs of aircraft, namely first leading and trailing aircraft 205, 207. External sources 328 may include weather data source 328A, aircraft sequence data source (AMAN) 328B, Aircraft Automatic Dependent Surveillance-Broadcast (ADS-B) systems 328C, and aircraft performance data sources 328D.

Data collected from each of the external sources 328 may have a contribution in determining an optimal inbound turn point along arc 106, 108 for aircraft 205, 207. For example, weather may be a significant factor in aircraft operations. Weather-related data 328A may determine the flight rules under which aircraft 205, 207 can operate in CDO mode, and can also affect vertical, horizontal and lateral aircraft separations. Aircraft separation requirements between arcs 106, 108 can increase during poor weather conditions, which may directly affect or alter descent profiles for aircraft 205, 207. For example, strong winds may cause erratic aircraft behavior on arcs 106, 108. Icy conditions at airport terminal areas subject to low temperatures may influence descent trajectories or speeds of aircraft 205, 207.

Arrival Manager (AMAN) 328B provides automated sequencing support for the ATCOs handling of air traffic. AMAN 328B continuously calculates arrival sequences and times for flights, taking into account a locally defined landing rate, a required spacing for flights arriving to runway 101, and other criteria. AMAN 328B also provides a "metering" tool, to assist BTM system 310 in regulating the flow of traffic into an aircraft terminal area. AMAN 328B optimizes use of the available capacity at an airport, reduces low-level holding delays and tactical intervention by the ATCO, resulting in reduced fuel consumption, noise, air pollution, and ATCO workload.

Automatic dependent surveillance-broadcast (ADS-B) systems 328C provide aircraft position details by utilizing a surveillance technology. Aircraft positions are continuously tracked via satellite navigation and periodic broadcast to provide updated positional information. ATC 314 can receive broadcasted positional information as a replacement for secondary surveillance radar. Likewise, other aircraft can also receive broadcasted positional information to provide situational awareness and allow self-separation. Broadcasted positional information may include information about the aircraft's location in space, altitude, descent information, vertical separation, lateral separation, horizontal separation, etc.

Aircraft Performance Data Sources 328D may be obtained from aircraft manufacturers in the form of an Airplane Flight Manual (AFM), together with the approved aircraft operating technique necessary to achieve AFM performance. The approved operating technique requires aircraft to be flown at specified configurations, power settings, and speeds corresponding to the actual aircraft mass throughout take-off to landing. Aircraft performance data may also be used for dynamic modeling of aircraft 205, 207, in motion. Aerodynamic coefficients of the aircraft may be used in kinematic modeling of the dynamics of aircraft motion in three degrees of freedom.

BTM system 310 performs an integration of the aircraft motion equation in a backward direction from touchdown point 102 to a current position of leading or trailing aircraft 205, 207. BTM system 310 does a back-calculation to determine an optimal inbound turn point to proceed directly to the merge point. As described above, BTM system 310 collects data from various external sources 328 to accurately predict an optimal turn point on arc 106, 108, for a trailing aircraft. Alternatively, BTM system 310 may determine at least some of the inputs 328 independently.

Figure 4A:
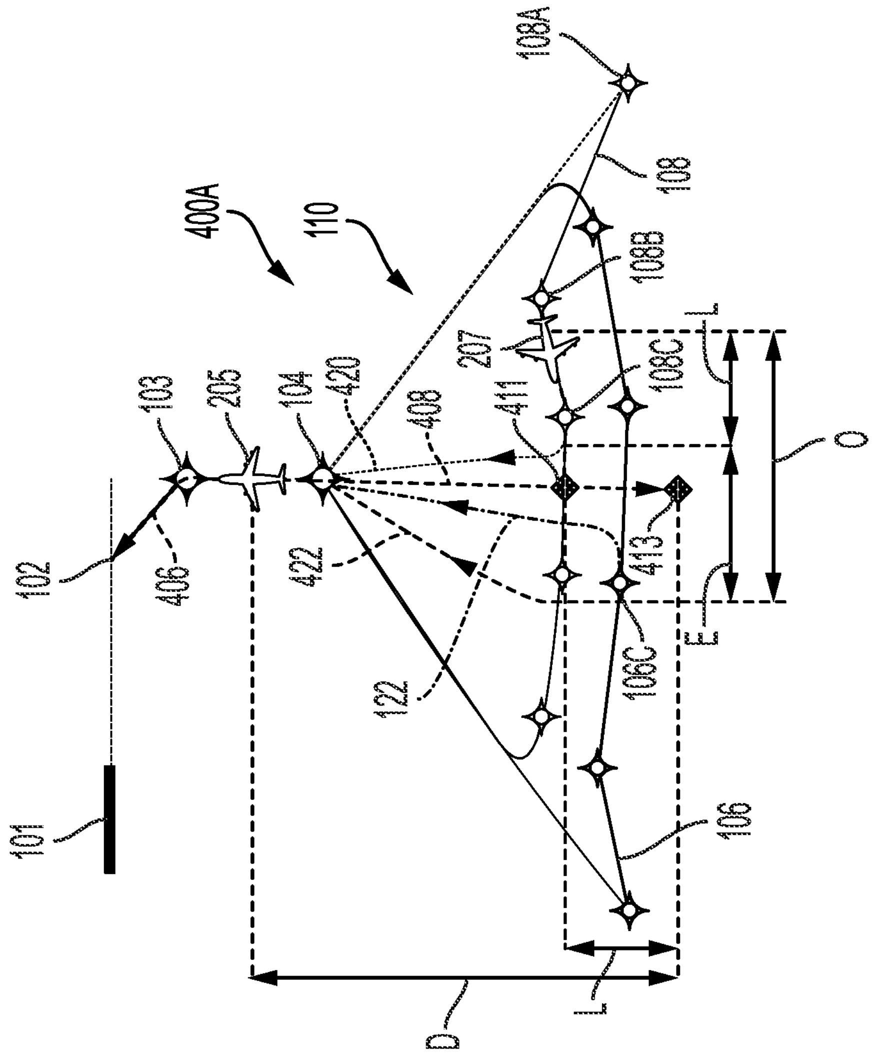
FIG. 4A is a schematic diagram of an altered flight path for the trailing aircraft generated by the aircraft arrival management system of FIG. 3.
Figure 4B:
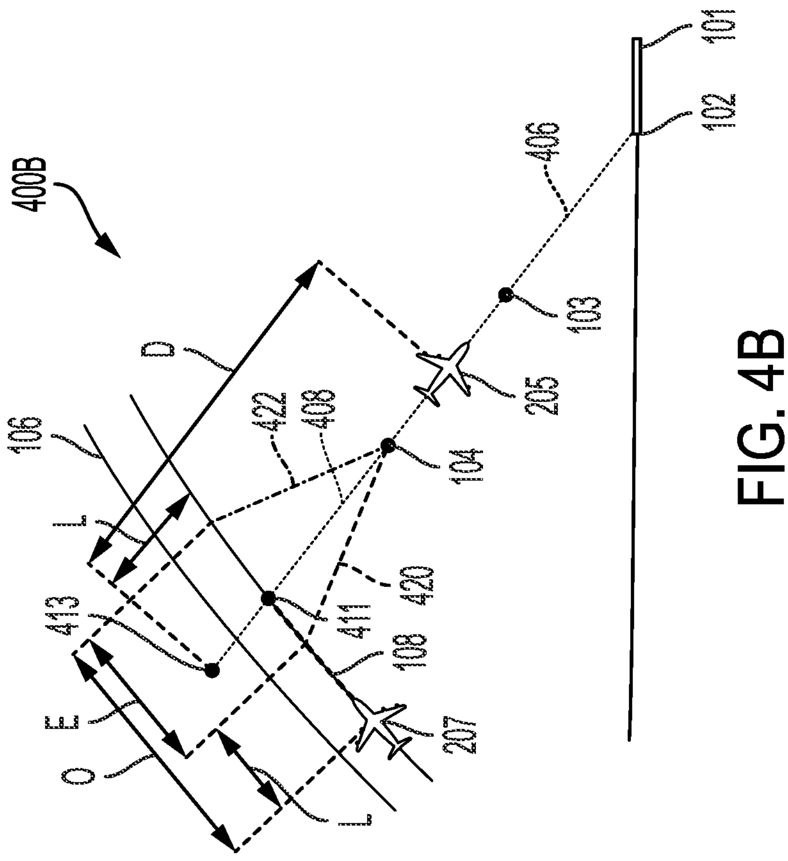
FIG. 4B is a schematic diagram of a vertical profile of the altered flight path for the trailing aircraft shown in FIG. 4A.

FIGS. 4A and 4B illustrate schematic lateral and vertical profile views 400A, 400B, respectively, of exemplary altered flight paths and backward trajectories generated by backward trajectory management system 310. First, BTM system 310, with the help of AMAN data source 328B selects a first pair of aircraft from a queue of aircraft arriving to land on runway 101, for generating backward trajectories. As described above, the first pair of aircraft is, namely, first leading aircraft 205 and first trailing aircraft 207.

BTM system 310, with the help of ADS-B data source 328C, identifies and tracks current, as well as subsequent, positions and speed of first leading aircraft 205 and first trailing aircraft 207 with respect to path envelope 110 in a given time frame. As seen in FIGS. 4A and 4B, first leading aircraft 205 has taken an inbound turn off arc 106 at arc point 106C and is headed toward approach point 103 after passing through merge point 104. First trailing aircraft 207 is traversing along second arc 108 in anticipation of receiving an inbound turn command from ATCO.

BTM system 310, with the help of BTM manager 322 and inputs from weather data source 328A and aircraft performance data source 328D, initiates backward trajectory calculations for first leading aircraft 205 and first trailing aircraft 207. A first backward trajectory 406 is calculated from touch down point 102 to the current position (between approach point 103 and merge point 104) of leading aircraft 205. Similarly, a second backward trajectory 408 is calculated from touch down point 102, through merge point 104, to the current position (between arc point 108B and 108C on arc 108) of trailing aircraft 207. BTM system 310 also calculates an Estimated Time of Arrival (ETA) for first leading aircraft 205 to arrive at touchdown point 102. As seen in FIGS. 4A and 4B, first or second backward trajectories 406, 408 for leading and trailing aircrafts 205, 207 respectively, intersects second arc 108 at an intersection point 411. Alternatively, intersection point 411 may also be defined as a time point when first trailing aircraft 207 intersects second arc 108, and backward trajectory calculation for first leading aircraft 205 is stopped at time point 411. In some examples, backward trajectory calculations may be stopped, when first or second backward trajectories 406, 408 intersect second arc 108 at intersection point 411. BTM system 310 with the help of AMAN data source 328B, ATC 314, and FMS 318 determines a minimum radar separation threshold R required between the leading and trailing aircraft 205, 207 for safe and conflict-free landing on runway 101.

Based on separation threshold R, BTM system 310 determines a threshold separation point 413 by extending first or second flight backward trajectories 406, 408 beyond arcs 106, 108, as shown in FIGS. 4A and 4B. Threshold separation distance D between threshold separation point 413 and the current position of leading aircraft 205 is equal to or greater than required separation threshold R.

A delta distance L is calculated by BTM system 310, based on the separation threshold R, corresponding to an optimal travel distance for trailing aircraft 207 along arc 108, before turning toward merge point 104 along first altered flight path 420. A distance between intersection point 411 on arc 108 and threshold separation point 413 may be defined as delta distance L. For example, delta distance L may be zero, if the threshold separation point 413 is inside arc 108. BTM system 310 may then determine relative aircraft speeds of the leading and trailing aircrafts, and make appropriate adjustments to delta distance L to achieve a safe and efficient landing sequence. If the trailing aircraft is flying slower than the leading aircraft, then the trailing aircraft is instructed to turn off of arc 108 toward merge point 104 along first altered flight path 420, as explained above. Alternatively, BTM system 310 may determine that trailing aircraft 207 may turn off 108 sooner than explained above, after traveling a shorter delta distance, while still achieving a safe and efficient separation between the leading and trailing aircraft.

However, if the trailing aircraft is flying faster than the leading aircraft, BTM system 310 may compute an extension distance E to add to delta distance L corresponding to an overall travel distance O for the trailing aircraft along second arc 108 before turning toward merge point 104. Extension distance E is calculated by calculating a time to touchdown for the leading aircraft and adding the time to touchdown for leading aircraft 205 to the flight time of trailing aircraft 207 in terms of distance E along the arc before turning toward the merge point. So the trailing aircraft flying faster than the leading aircraft travels an overall distance O, corresponding to a sum of distances L+E (delta distance L and extension distance E), along arc 108 before making an inbound turn to descend towards merge point 104, and then to touch down point 102 along a second altered flight path 422. In this manner, trailing aircraft 207 reaches touchdown point 102 while maintaining a separation distance at least equal to separation threshold R.

Lastly, BTM system 310 communicates all data regarding newly calculated backward trajectories and altered flight paths for trailing aircraft 207 with ATCO. The data includes a travel distance that first trailing aircraft 207 should travel along the arc before turning toward merge point 104 to provide adequate separation between first leading aircraft 205 and first trailing aircraft 207 for a safe and efficient landing on runway 101. In various examples, depending upon the relative speed of a trailing aircraft compared to a leading aircraft, travel distance may include delta distance L, extension distance E, or overall distance O. BTM system 310 is configured to adapt to different variables and provide optimal turn points for continuous descent for trailing aircraft 207. Examples of such variables may include weather conditions, air traffic workload, aircraft performance, geographical constraints, runway availability, and runway configurations.

After verifying and validating data regarding newly calculated back calculation of trajectories and altered flight paths for trailing aircraft 207, ATCO controller 314 directly sends the data to FMS 318 via Controller-Pilot Data Link Communications (CPDLC) or an alternative communication protocol. By implementing BTM system 310, a pair of aircraft 205, 207 are separated close to the minimum radar separation threshold, leading to better runway throughput. Aircraft fly only an optimal number of miles before arriving to land, thus reducing fuel consumption and carbon footprint. ATCO controller 314 workload using the described arrival aircraft management systems may also be reduced. As ATCO controller 314 passes on the instruction to FMS 318 after validation via CPDLC, radiotelephony traffic congestion is also reduced or eliminated.

Figure 5A:
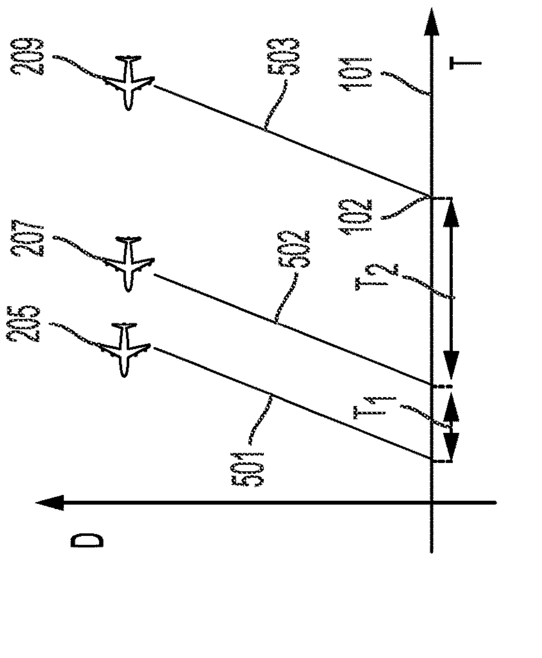
FIG. 5A is a schematic diagram of flight descent paths for three consecutive aircraft showing unequal landing separation distances.
Figure 5B:
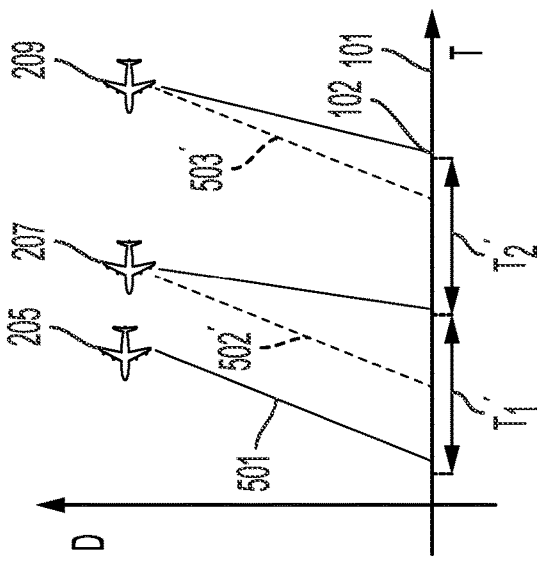
FIG. 5B is a schematic diagram of modified flight descent paths for the three-consecutive aircraft of FIG. 5A, showing equal landing separation distances after implementing altered flight path trajectories generated by the aircraft arrival management system of FIG. 3.

FIGS. 5A and 5B illustrate a schematic distance versus time (D/T) plot of an exemplary flight descent path for three consecutive aircraft on to runway 101. As seen in FIG. 5A, three consecutive aircraft, namely, 205, 207, and 209 descend by flight paths 501, 502, 503 on to runway 101 at touch down point 102 at unequal time gaps, T1, T2, which may pose safety and/or sub-optimal efficiency problems.

By implementing BTM system 310 to control landing times for the three-consecutive aircraft as shown in FIG. 5B, landings may be carried out with equal time gaps T1', T2', configured to satisfy safety and efficiency objectives. For backward trajectory calculation purposes, BTM system 310 may designate aircraft 205, 207 as a first pair of leading and trailing aircraft, and aircraft 207, 209 as a second pair of leading and trailing aircraft. In other words, trailing aircraft 207 of the first pair of aircraft may be redesignated as a leading aircraft of the second pair of aircraft.

Figure 5C:
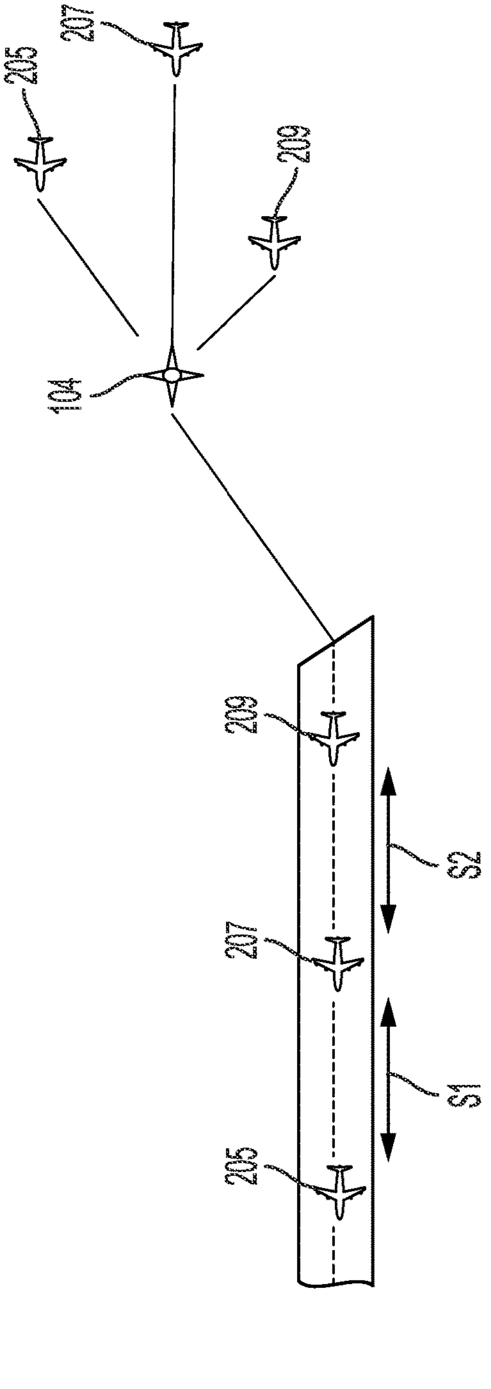
FIG. 5C is a schematic diagram of the flight paths shown in FIG. 5B, coordinating through a merge point and landing with optimal equal spacing between aircraft.

For example, backward trajectories 406, 408 may be calculated for each of the first and second pairs of aircraft from touch down point 102 to determine optimal turning points from arcs 106, 108, respectively. Delta distances are calculated that correspond to optimal distances for first and second trailing aircraft 207, 209 to travel along arcs 106, 108, respectively, before turning toward merge point 104. Aircrafts 207, 209 descend by altered flight paths 502', 503' to provide adequate separation S1, S2 between the first and second pairs of aircraft for a safe and efficient landing sequence on runway 101. Therefore, aircraft 205, 207, and 209 are equidistant from one another on runway 101, as seen in FIG. 5C, as BTM system 310 provides for conflict-free, safe, and efficient arrival management on airport runway 101.

B. Illustrative Method for Controlling Timing of Aircraft Landing

This section describes steps of an illustrative backward trajectory management method for controlling timing of aircraft landing. Aspects of a backward trajectory management system for controlling timing of aircraft landing as described above may be utilized in the method steps described below. Where appropriate, reference may be made to components and systems that may be used in carrying out each step. These references are for illustration, and are not intended to limit the possible ways of carrying out any particular step of the method.

Figure 6:
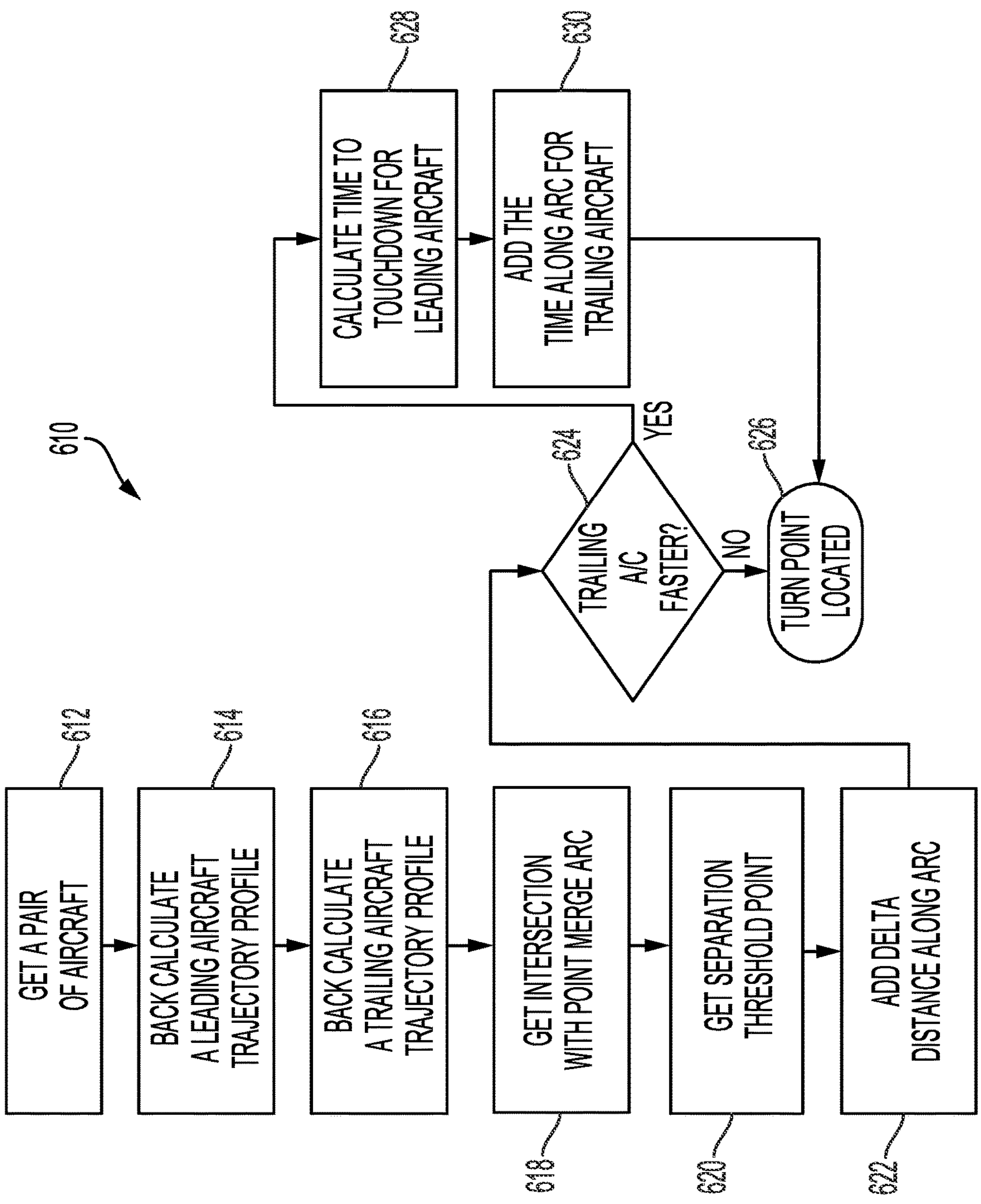
FIG. 6 is a flowchart depicting steps for use by the aircraft arrival management system of FIG. 3.

FIG. 6 is a flowchart illustrating steps performed in an illustrative method and may not recite the complete process or all steps of the method. Although various steps of method 610 are described below and depicted in FIG. 6, the steps need not necessarily all be performed, and in some cases, may be performed simultaneously or in a different order.

Step 612 includes getting or selecting a first pair of aircraft by BTM system 310, namely a first leading aircraft 205 and a first trailing aircraft 207. Step 612, further includes assigning first trailing aircraft 207 to one of multiple arcs (for example arc 108) having a common center at merge point 104. Each aircraft 205, 207 is on a flight path 110 configured for landing on runway 101. Step 612 may further include identifying and tracking current and subsequent positions and speed of first leading and first trailing aircraft 205, 207 with respect to path envelope 110 in a given time frame. For example, first leading aircraft 205 may be heading towards approach point 103 after passing over merge point 104. First trailing aircraft 207 may be traversing along second arc 108 in anticipation of an inbound turn command from ATCO. Step 612, further includes selecting a second pair of aircraft, including reassigning or redesignating first trailing aircraft 207 of the first pair of aircraft as a second leading aircraft, and selecting a second trailing aircraft 209 of the second pair of aircraft.

Step 614 includes back calculating a first trajectory profile 406, from touchdown point 102 on runway 101, to a current airspace position of first leading aircraft 205, and estimating when the first leading aircraft will arrive at touchdown point 102. Step 614, may further include back calculating a trajectory profile, from touchdown point 102 on runway 101, to a current airspace position of the second leading aircraft.

Step 616 includes back calculating a second trajectory profile 408, from touchdown point 102 to a current airspace position of the first trailing aircraft 207. Step 616 may further include back calculating a trajectory profile, from touchdown point 102 to a current airspace position of second trailing aircraft 209.

Each of steps 614 and 616 includes using aircraft performance data, and weather data for adjusting back calculations based on changing wind conditions. Each of steps 614 and 616 further includes using aerodynamic coefficients of the aircraft in a three degree of freedom kinematic modeling of the aircraft's dynamic motion for leading and trailing aircraft 205, 207, 209.

Step 618 includes getting or computing an intersection or time point 411, when first trailing aircraft 207 intersects arc 108, stopping back-calculation of the first trajectory profile for the first leading aircraft at time or intersection point 411. Alternatively, step 618, includes determining a time or intersection point 411 when the first or second trajectory profile intersects the second arc 108.

Step 620 includes getting or calculating a threshold separation point 413 by stopping backward calculation once a threshold separation distance D to first leading aircraft 205 is above a minimum radar separation distance threshold R, and computing the distance from point merge intersection 411 to threshold separation point 413. For example, minimum radar separation distance threshold R is determined between leading and trailing aircraft 205, 207 for safe and conflict-free landing on runway 101. Separation threshold point 413 is determined by extending first or second flight backward trajectory profile 406, 408 beyond arcs 106, 108. Step 620 further includes calculating a delta distance L that the first trailing aircraft 207 should travel along the arc 108 before turning toward the merge point 104 to provide adequate separation between the first leading and trailing aircraft 205, 207 for a safe landing. Step 620 may further include calculating a delta distance corresponding to travel distance of second trailing aircraft 209 of second pair of aircraft. Delta distance L corresponds to the distance between threshold separation point 413 and second arc intersection point 411. Delta distance L may be equal to or less than zero, when the separation threshold point is between the point merge arc intersection and the merge point.

Step 622 includes adding or calculating a distance corresponding to delta distance L on to the first trailing aircraft 207 travel path along arc 108, and determining an optimal turn point for trailing aircraft 207 to achieve an optimal safe and efficient separation between the leading and trailing aircraft.

Step 624 includes determining if trailing aircraft 207 is faster than leading aircraft 205. If the answer to step 624 is "No", or in other words, if trailing aircraft 207 is not faster than leading aircraft 205, then step 626 includes locating and instructing trailing aircraft 207 to turn off arc 108 toward merge point 104, after traveling delta distance L along arc 108, as described above.

If the answer to step 624 is "Yes", or in other words, trailing aircraft 207 is faster than leading aircraft 205, then step 628 includes calculating a remaining time to touchdown for leading aircraft 205. Step 630 then includes adding the remaining time or corresponding extension distance E along second arc 108 for trailing aircraft 207 to traverse prior to turning toward merge point 104. Accordingly, trailing aircraft 207 travels along arc 108 an overall distance corresponding to the sum of distances L+E, namely, the sum of delta distance L and extension distance E.

C. Illustrative Data Processing System

Figure 7:
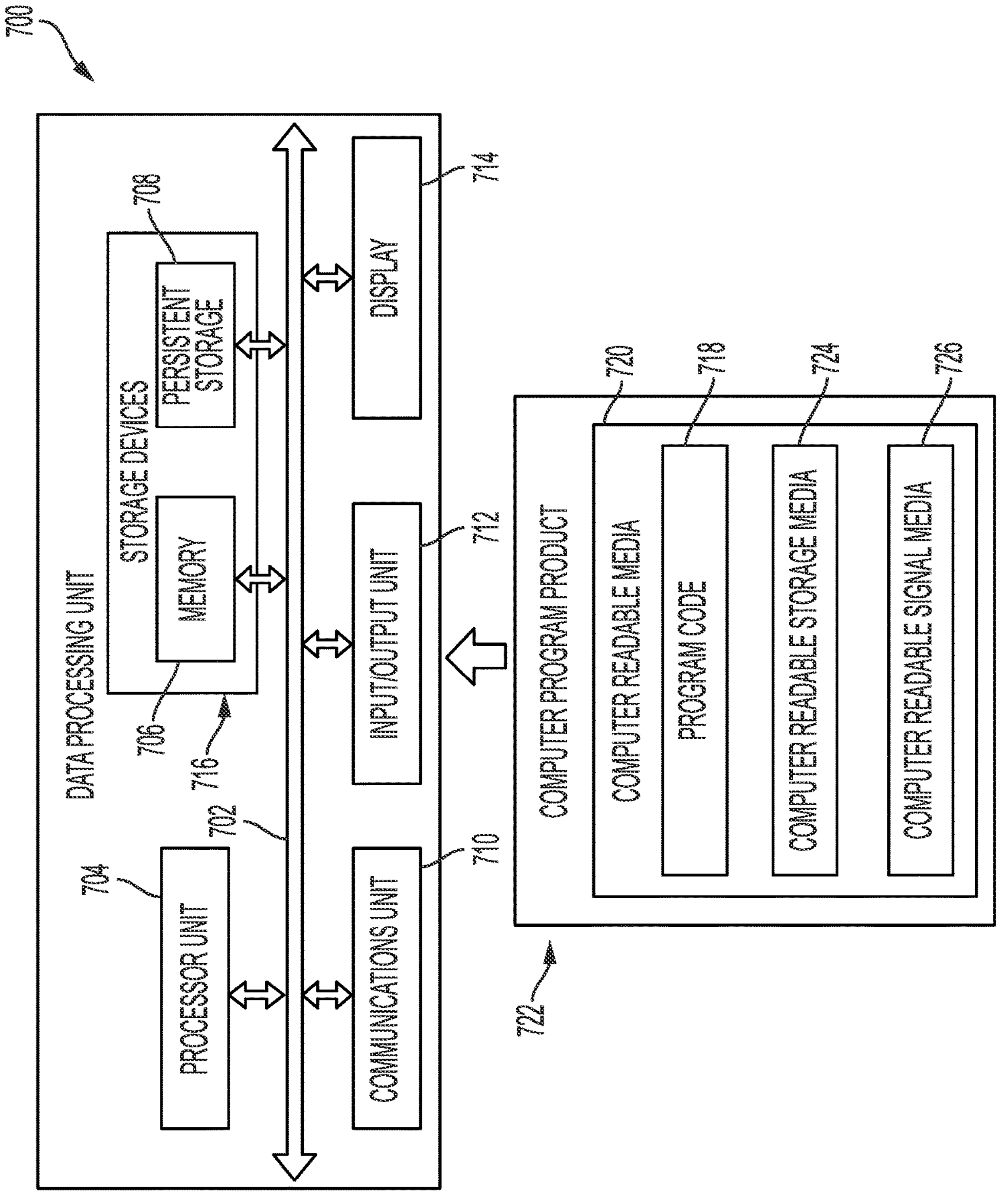
FIG. 7 is a schematic diagram of a data processing system for implementing an aircraft arrival management system, as show in FIG. 3.

FIG. 7 shows a data processing system 700 in which illustrative embodiments may be implemented. Data processing system 700 is a data processing system that may be, or may be included in aircraft arrival management system 302 and/or backward trajectory management system 310 described in FIG. 3.

Data processing system 700 includes a communications framework 702. Communications framework 702 (e.g. a bus) provides communications between a processor unit 704, a memory 706, a persistent storage 708, a communications unit 710, an input/output (I/O) unit 712, and a display 714. In some examples, aircraft arrival management system 302, backward trajectory management system 310, and backward trajectory manager 322 may include plurality of processor units 704, and more or fewer components than those illustrated. Memory 706, persistent storage 708, communications unit 710, input/output (I/O) unit 712, and display 714 are examples of resources accessible by processor unit 704 via communications framework 702.

Processor unit 704 may run instructions for software that may be loaded into memory 706, from a storage device, such as persistent storage 708. Processor unit 704 may be a number of processors, a multi-processor core, or some other type of processor, depending on the particular implementation. Further, processor unit 704 may be implemented using a number of heterogeneous processor systems in which a main processor may be present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis.

Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 or the device the storage media is contained in also may be removable. For example, a removable optical disk or removable flash drive may be used for computer readable storage media, or a removable hard drive may be used for persistent storage 708.

Communications unit 710, in these examples, may provide for communications with other data processing systems or devices. In these examples, communications unit 710 may be a network interface card. Communications unit 710 may provide communications through the use of either or both physical and wireless communications links.

Input/output (I/O) unit 712 may allow for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 may provide a mechanism to display information to a user.

Instructions for the operating system, applications, and/or programs may be located in storage devices 716, which may be in communication with processor unit 704 through communications framework 702. In these illustrative examples, the instructions may be in a functional form on persistent storage 708. These instructions may be loaded into memory 706 for execution by processor unit 704. The processes of the different embodiments may be performed by processor unit 704 using computer-implemented instructions, which may be located in a memory, such as memory 706, or transferred to a memory from a persistent storage device.

These instructions may be referred to as program instructions, program code, computer usable program code, or computer readable program code that may be read and executed by a processor in processor unit 704. The program code in the different embodiments may be embodied on different physical or computer readable storage media, such as memory 706 or media of persistent storage 708.

Program code 718 may be located in a functional form on computer readable media 720 that is selectively removable and may be loaded onto or transferred to data processing system 700 for execution by processor unit 704. Program code 718 and computer readable media 720 may form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage device containing storage media, such as a hard drive, a thumb drive, or a flash memory, that is connected to data processing system 700. In some instances, computer readable storage media 724 may not be removable from data processing system 700.

In these examples, computer readable storage media 724 may be a physical or tangible storage device used to store program code 718 rather than a medium that propagates or transmits program code 718. Computer readable storage media 724 may be also referred to as a computer readable tangible storage device or a computer readable physical storage device. In other words, computer readable storage media 724 may be a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, a voltage signal, and/or any other suitable type of signal. These signals may be transmitted over communications links, such as wireless communications links, optical fiber cable, coaxial cable, a wire, and/or any other suitable type of communications link. In other words, the communications link and/or the connection may be a physical structure or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use, such as firmware. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 718 may be omitted, because the processes for the different embodiments may be implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications framework 702.

Illustrative Combinations and Additional Examples

This section describes additional aspects and features of aircraft arrival management system, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. A method of controlling timing of aircraft landing, comprising:

selecting a first leading aircraft and a first trailing aircraft, each aircraft being on a flight path configured for landing on a runway, back calculating a trajectory profile from a touchdown point on the runway, to a current airspace position of the first leading aircraft, and estimating when the first leading aircraft will arrive at the touchdown point, back calculating a trajectory profile from the touchdown point to a current airspace position of the first trailing aircraft, and determining a time point when the first trailing aircraft will intersect an arc having a merge point center, stopping back calculation of the trajectory profile for the first leading aircraft at the time point when the first trailing aircraft will intersect the arc, and calculating a delta distance that the first trailing aircraft should travel along the arc before turning toward the merge point to provide adequate separation between the first leading aircraft and the first trailing aircraft for safe landing.

A1. The method of claim A, further comprising:

redesignating the first trailing aircraft as a second leading aircraft, and selecting a second trailing aircraft, back calculating trajectories of the second leading aircraft and the second trailing aircraft from the touchdown point, and calculating a delta distance corresponding to a travel distance of the second trailing aircraft along the arc before turning toward the merge point to provide adequate separation between the second leading aircraft and the second trailing aircraft for safe landing.

A2. The method of A or A1, further comprising:

determining a threshold separation point where a distance to the first leading aircraft is above a separation threshold, and calculating the delta distance corresponding to a distance between the threshold separation point and the arc.

A3. The method of any of A-A2, wherein the delta distance is zero when the separation point is inside the arc.

A4. The method of any of A-A2, further comprising:

determining if the first trailing aircraft is faster than the first leading aircraft, and if so, adding an extension distance to the delta distance corresponding to a travel distance of the first trailing aircraft along the arc before turning toward the merge point.

A5. The method of A4, wherein the extension distance is calculated by:

calculating a time to touchdown for the first leading aircraft, and adding the time to touchdown for the first leading aircraft to a flight time of the first trailing aircraft along the arc before turning toward the merge point.

A6. The method of any of A-A5, further comprising:

using aircraft performance data in the back calculation steps.

A7. The method of any of A-A5, further comprising:

for each of the first leading aircraft and the first trailing aircraft, using aerodynamic coefficients of the aircraft in a three degree of freedom kinematic modeling of the aircraft's dynamic motion.

A8. The method of any of A-A7, further comprising:

using weather data in the back calculation steps.

A9. The method of any of A-A8, further comprising:

adjusting back calculations based on changing wind conditions.

A10. The method of any of A-A9, further comprising:

assigning the first trailing aircraft to one of multiple arcs having a common center at the merge point.

B. A method of controlling timing of aircraft landing, comprising:

selecting a first leading aircraft and a first trailing aircraft, each aircraft being on a flight path configured for landing on a runway, back calculating flight trajectories for each aircraft from a touchdown point on the runway, determining a threshold separation distance required between the leading and trailing aircraft for safe landing, and calculating a delta distance, based on the threshold separation distance, corresponding to a travel distance of the first trailing aircraft along an arc centered around a merge point, before turning toward the merge point.

B1. The method of B, wherein the threshold separation distance is a distance from the leading aircraft to a separation threshold point beyond the arc.

B2. The method of B1, wherein the delta distance is a distance from the separation threshold point to the arc.

B3. The method of B1, wherein the delta distance is zero when the separation threshold point is inside the arc.

B4. The method of B, further comprising:

redesignating the first trailing aircraft as a second leading aircraft, and selecting a second trailing aircraft, back calculating trajectories of the second leading aircraft and the second trailing aircraft from the touchdown point, and calculating a delta distance corresponding to a travel distance of the second trailing aircraft along the arc before turning toward the merge point to provide adequate separation between the second leading aircraft and the second trailing aircraft.

B5. The method of B, further comprising:

determining if the first trailing aircraft is faster than the first leading aircraft, and if so, adding an extension distance to the delta distance corresponding to a travel distance of the first trailing aircraft along the arc before turning toward the merge point.

B6. The method of B5, wherein the extension distance is calculated by:

calculating a time to touchdown for the first leading aircraft, and adding the time to touchdown for the first leading aircraft to a flight time of the first trailing aircraft along the arc before turning toward the merge point.

C. A system for controlling timing of aircraft landing, comprising:

one or more processors, a memory including one or more digital storage devices, and a plurality of instructions stored in the memory and executable by the one or more processors to:

back calculate flight trajectories for each of a leading aircraft and a trailing aircraft from a common touchdown point on a runway, determine a threshold separation distance required between the leading and trailing aircraft for safe landing, and calculate a delta distance, based on the threshold separation distance, corresponding to a travel distance of the trailing aircraft along an arc centered around a merge point, before turning toward the merge point.

C1. The system of C, wherein the threshold separation distance is a distance from the leading aircraft to a separation threshold point beyond the arc.

C2. The system of any of C or C1, wherein the delta distance is a distance from the separation threshold point to the arc.

C3. The system of any of C-C2, wherein the plurality of instructions are further executable by the one or more processors to:

determine if the trailing aircraft is faster than the leading aircraft, and if so, add an extension distance to the delta distance corresponding to a travel distance of the trailing aircraft along the arc before turning toward the merge point.

C4. The system of C3, wherein the extension distance is calculated by:

calculating the time to touchdown for the leading aircraft, and adding a time to touchdown for the leading aircraft to a flight time of the trailing aircraft along the arc before turning toward the merge point.

Advantages, Features, and Benefits

The different examples of systems and methods for aircraft arrival management described herein provide several advantages over known solutions for optimizing point merge-operations. For example, illustrative examples described herein allow for determining an optimal turn point for an aircraft on a fly arc in a flight path envelope.

Additionally, and among other benefits, illustrative examples described herein allow for upstream conflict resolution to achieve optimal separation between a pair of aircraft.

Additionally, and among other benefits, illustrative examples described herein allow for a reduction in controller workload during point merge operations of aircraft.

Additionally, and among other benefits, illustrative examples described herein allow for the generation of backward trajectories based on aircraft performance characteristics.

No known system or device can perform these functions, particularly in cases including faster and slower trailing aircraft. Thus, the illustrative examples described herein are particularly useful for aircraft arrival management. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of controlling timing of aircraft landing, comprising:

providing a backward trajectory management system, including one or more processors and a memory having a plurality of stored instructions, and using the backward trajectory management system to:

receive traffic and airspace data for a plurality of aircraft, including aircraft position and trajectory, weather data, and aircraft performance data, from external sources including an Arrival Manager and automatic dependent surveillance-broadcast system, select a first leading aircraft and a first trailing aircraft of the plurality of aircraft, each aircraft being on a flight path configured for landing on a runway, determine an adequate separation distance between the first leading aircraft and the first trailing aircraft to provide safe landing, back calculate a trajectory profile from a touchdown point on the runway, to a current airspace position of the first leading aircraft, and estimating when the first leading aircraft will arrive at the touchdown point based on the received traffic and airspace data for the first leading aircraft, back calculate a trajectory profile from the touchdown point to a current airspace position of the first trailing aircraft, and determine a time point when the first trailing aircraft will intersect an arc having a merge point as a center, based on the received traffic and airspace data for the first trailing aircraft, stop back calculation of the trajectory profile for the first leading aircraft at the time point when the first trailing aircraft will intersect the arc, calculate a delta distance (L) that the first trailing aircraft should travel along the arc before turning toward the merge point to provide adequate separation between the first leading aircraft and the first trailing aircraft for safe landing, and synchronously communicate calculated trajectory profiles and an altered flight path for the first trailing aircraft including the delta distance (L) with an Air Traffic Control operator.

2. The method of claim 1, further comprising:
redesignating the first trailing aircraft as a second leading aircraft, and selecting a second trailing aircraft,
back calculating trajectories of the second leading aircraft and the second trailing aircraft from the touchdown point, and
calculating a delta distance (L) corresponding to a travel distance (L) of the second trailing aircraft along the arc before turning toward the merge point to provide adequate separation between the second leading aircraft and the second trailing aircraft for safe landing.

3. The method of claim 2, further comprising:
determining if the second trailing aircraft is faster than the second leading aircraft, and if so, adding an extension distance (E) to the delta distance (L) corresponding to a travel distance (L+E) of the second trailing aircraft along the arc before turning toward the merge point.

4. The method of claim 3, wherein the extension distance (E) is calculated by:
calculating a time to touchdown for the second leading aircraft, and
adding the time to touchdown for the second leading aircraft to a flight time of the second trailing aircraft along the arc before turning toward the merge point.

5. The method of claim 1, further comprising:
determining a threshold separation point where a distance from the threshold separation point to the first leading aircraft is above a separation threshold (R), and
calculating the delta distance (L) corresponding to a distance between the threshold separation point and the arc.

6. The method of claim 5, wherein the delta distance (L) is zero when the threshold separation point is inside the arc.

7. The method of claim 1, further comprising:
using aerodynamic coefficients of the first leading aircraft in a three degree of freedom kinematic modeling of the first leading aircraft's dynamic motion, and
using aerodynamic coefficients of the first trailing aircraft in a three degree of freedom kinematic modeling of the first trailing aircraft's dynamic motion.

8. The method of claim 1, further comprising:
adjusting back calculations based on changing wind conditions.

9. The method of claim 1, further comprising:
assigning the first trailing aircraft to one of multiple arcs having a common center at the merge point.

10. The method of claim 1, further including selecting the arc with the backward trajectory management system to minimize the delta distance (L) needed to provide the determined adequate separation distance based on the received traffic and airspace data.

11. The method of claim 1, wherein the adequate separation distance is determined based on data received from the Arrival Manager and a Flight Management System, and input received from the Air Traffic Control operator.

12. A method of controlling timing of aircraft landing, comprising:
providing a backward trajectory management system, including a digital processing system and a memory including stored instructions,
receiving traffic and airspace data from a plurality of aircraft, including aircraft position and trajectory, weather data, and aircraft performance specifications,
selecting a first leading aircraft and a first trailing aircraft of the plurality of aircraft, each aircraft being on a flight path configured for landing on a runway,
back calculating flight trajectories for each aircraft from a touchdown point on the runway based on the received traffic and airspace data,
determining a threshold separation distance (D) required between the leading and trailing aircraft for safe landing,
calculating a delta distance (L), based on the threshold separation distance (D), corresponding to a travel distance (L) of the first trailing aircraft along an arc centered around a merge point, before turning toward the merge point, and
synchronously communicating calculated trajectories with an Air Traffic Control system.

13. The method of claim 12, wherein the threshold separation distance (D) is a distance from the leading aircraft to a separation threshold point beyond the arc.

14. The method of claim 13, wherein the delta distance (L) is a distance from the separation threshold point to the arc.

15. The method of claim 13, wherein the delta distance is zero when the separation threshold point is inside the arc.

16. The method of claim 12, further comprising:
redesignating the first trailing aircraft as a second leading aircraft, and selecting a second trailing aircraft,
back calculating trajectories of the second leading aircraft and the second trailing aircraft from the touchdown point runway based on the received traffic and airspace data, and
calculating a delta distance (L) corresponding to a travel distance (L) of the second trailing aircraft along the arc before turning toward the merge point to provide adequate separation between the second leading aircraft and the second trailing aircraft.

17. A system for controlling timing of aircraft landing, comprising:
one or more processors,
a memory including one or more digital storage devices,
a radar communication system providing communication with Air Traffic Control, and
a plurality of instructions stored in the memory and executable by the one or more processors to:
receive traffic and airspace data for a plurality of aircraft, including aircraft position and trajectory, weather data, and aircraft performance specifications,
back calculate flight trajectories for each of a leading aircraft and a trailing aircraft from a common touchdown point on a runway based on the received traffic and airspace data,
determine a threshold separation distance (D) required between the leading and trailing aircraft for safe landing,
calculate a delta distance (L), based on the threshold separation distance (D), corresponding to a travel distance (L) of the trailing aircraft along an arc centered around a merge point, before turning toward the merge point, and
synchronously communicate calculated trajectories with an Air Traffic Control system.

18. The system of claim 17, wherein the threshold separation distance (D) is a distance from the leading aircraft to a separation threshold point beyond the arc.

19. The system of claim 18, wherein the delta distance (L) is a distance from the separation threshold point to the arc.

20. The system of claim 17, wherein the plurality of instructions are further executable by the one or more processors to:

determine if the trailing aircraft is faster than the leading aircraft, and if so, add an extension distance (E) to the delta distance (L) corresponding to a travel distance (L+E) of the trailing aircraft along the arc before turning toward the merge point.

* * * * *